(12) United States Patent
Lewis et al.

(10) Patent No.: US 7,724,417 B2
(45) Date of Patent: May 25, 2010

(54) MEMS SWITCHES WITH DEFORMING MEMBRANES

(75) Inventors: Alan Lewis, Sunnyvale, CA (US); Lior Kogut, Sunnyvale, CA (US); Ming-Hau Tung, San Francisco, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 322 days.

(21) Appl. No.: 11/641,649

(22) Filed: Dec. 19, 2006

(65) Prior Publication Data

US 2008/0142347 A1 Jun. 19, 2008

(51) Int. Cl.
G02B 26/00 (2006.01)
G02B 26/12 (2006.01)

(52) U.S. Cl. .................. 359/290; 359/224.1
(58) Field of Classification Search .......... 359/290, 359/291, 292, 320, 322, 324, 220, 223, 224, 359/247, 212, 214, 302, 223.1; 310/309, 310/310

See application file for complete search history.

(56) References Cited

U.S. PATENT DOCUMENTS

| | | |
|---|---|---|
| 4,425,572 A | 1/1984 | Takafuji et al. |
| 4,954,789 A | 9/1990 | Sampsell |
| 5,226,099 A | 7/1993 | Mignardi et al. |
| 5,367,878 A | 11/1994 | Muntz et al. |
| 5,526,172 A | 6/1996 | Kanack |
| 5,578,976 A | 11/1996 | Yao |
| 5,619,061 A | 4/1997 | Goldsmith et al. |
| 5,638,946 A | 6/1997 | Zavracky |
| 5,784,189 A | 7/1998 | Bozler et al. |
| 5,946,176 A | 8/1999 | Ghoshal |
| 6,040,937 A | 3/2000 | Miles |
| 6,310,339 B1 | 10/2001 | Hsu et al. |
| 6,376,787 B1 | 4/2002 | Martin et al. |
| 6,529,654 B1 | 3/2003 | Wong et al. |
| 6,574,033 B1 | 6/2003 | Chui et al. |
| 6,625,047 B2 | 9/2003 | Coleman, Jr. |
| 6,674,562 B1 | 1/2004 | Miles et al. |
| 6,787,438 B1 | 9/2004 | Nelson |
| 6,836,651 B2 * | 12/2004 | Segal et al. .................. 455/405 |
| 6,972,881 B1 | 12/2005 | Bassetti |
| 6,982,515 B2 * | 1/2006 | Howell et al. ............... 310/307 |
| 7,034,783 B2 | 4/2006 | Gates et al. |
| 7,123,216 B1 | 10/2006 | Miles |

(Continued)

FOREIGN PATENT DOCUMENTS

EP 0 706 164 4/1996

(Continued)

OTHER PUBLICATIONS

ISR and WO for PCT/US07/025938, filed Dec. 17, 2007.

(Continued)

*Primary Examiner*—Scott J Sugarman
*Assistant Examiner*—Tuyen Q Tra
(74) *Attorney, Agent, or Firm*—Knobbe Martens Olson & Bear LLP

(57) ABSTRACT

MEMS switches are formed with membranes or layers that are deformable upon the application of a voltage. The MEMS switches may comprise compliant terminals and/or contact conductors to produce contact swiping.

25 Claims, 21 Drawing Sheets

U.S. PATENT DOCUMENTS

| | | |
|---|---|---|
| 7,161,728 B2 | 1/2007 | Sampsell et al. |
| 7,196,837 B2 | 3/2007 | Sampsell et al. |
| 7,489,228 B2 * | 2/2009 | Robert .................. 337/89 |
| 2002/0000959 A1 | 1/2002 | Colgan et al. |
| 2002/0024711 A1 | 2/2002 | Miles |
| 2002/0050882 A1 | 5/2002 | Hyman et al. |
| 2002/0097133 A1 | 7/2002 | Charvet et al. |
| 2002/0179421 A1 | 12/2002 | Williams et al. |
| 2002/0186108 A1 | 12/2002 | Hallbjorner |
| 2004/0022044 A1 | 2/2004 | Yasuoka et al. |
| 2004/0223204 A1 | 11/2004 | Mao et al. |
| 2005/0116924 A1 | 6/2005 | Sauvante et al. |
| 2005/0122560 A1 | 6/2005 | Sampsell et al. |
| 2005/0286113 A1 | 12/2005 | Miles |
| 2006/0066935 A1 | 3/2006 | Cummings et al. |
| 2006/0066937 A1 | 3/2006 | Chui |
| 2006/0067648 A1 | 3/2006 | Chui et al. |
| 2006/0103613 A1 | 5/2006 | Chui |

FOREIGN PATENT DOCUMENTS

| | | |
|---|---|---|
| EP | 1146533 A1 | 10/2001 |
| EP | 1343190 A2 | 9/2003 |
| WO | WO 03/007049 A1 | 1/2003 |
| WO | WO 03/060940 A1 | 7/2003 |
| WO | WO 2006/036560 | 4/2006 |

OTHER PUBLICATIONS

Miles et al., 5.3: Digital Paper™: Reflective displays using interferometric modulation, SID Digest, vol. XXXI, 2000 pp. 32-35.

Miles, MEMS-based interferometric modulator for display applications, Part of the SPIE Conference on Micromachined Devices and Components, vol. 3876, pp. 20-28 (1999).

Peroulis et al., Low contact resistance series MEMS switches, 2002, pp. 223-226, vol. 1, IEEE MTT-S International Microwave Symposium Digest, New York, NY.

IPRP for PCT/US07/025938, filed Dec. 17, 2007.

* cited by examiner

MEMS SWITCHES WITH DEFORMING MEMBRANES

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

DETAILED DESCRIPTION OF CERTAIN EMBODIMENTS

Figure 1:
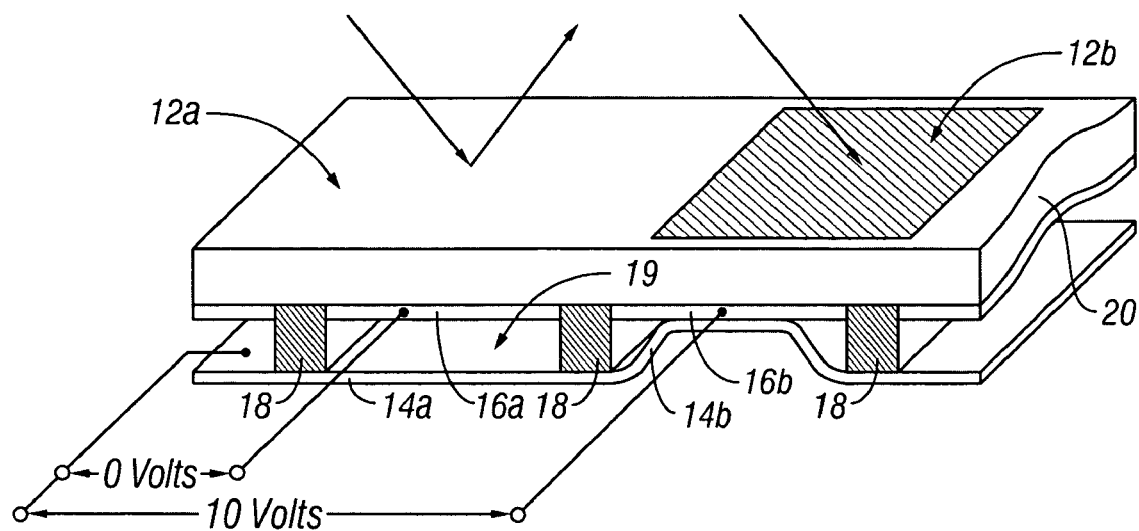
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Several such embodiments are described herein. These switches can be advantageously utilized in many applications due to overlap between switch fabrication steps and display fabrication steps. MEMS switches built from the same basic structure as interferometric modulators ease the integration of logic and switching functions with interferometric modulator arrays. It is possible that other types of switches may be integrated, such as switches fabricated in a manner not similar to the fabrication of the interferometric elements, and more conventional electronic switches fabricated using thin silicon films deposited on the glass substrate. However, because fabrication of interferometric modulator based MEMS switches may be performed using many of the same processing steps that are used in fabricating interferometric modulators, these MEMS switches may be inexpensively integrated onto the same substrate as an array of interferometric modulators used, for example, for a display.

For example, in one embodiment the MEMS switches and interferometric modulators may be fabricated using the same process, although extra steps may be performed on the interferometric modulators and/or the MEMS switches during the manufacturing process. For example, deposition and etching steps to add terminals to the MEMS switches are unnecessary for the fabrication of interferometric modulators. In such an embodiment some common steps would be performed, such as those for forming the electrodes, etc. The MEMS switch terminals would then be formed. After these steps would follow more steps necessary for both the interferometric modulators and the MEMS switches, thus providing a combined interferometric modulator and MEMS switch array. In yet another embodiment, the same process that is used for manufacturing interferometric modulators is used in manufacturing MEMS switches. The interferometric modulators may first be fabricated on a substrate, followed by fabrication of MEMS switches on the substrate. Similarly, MEMS switches may first be fabricated on a substrate, followed by fabrication of interferometric modulators on the substrate. In either case, the manufacturing process does not require significant modification as the MEMS switches comprise many of the same structures as the interferometric modulators.

Beginning first with a description of flexing membrane optical modulators, one interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
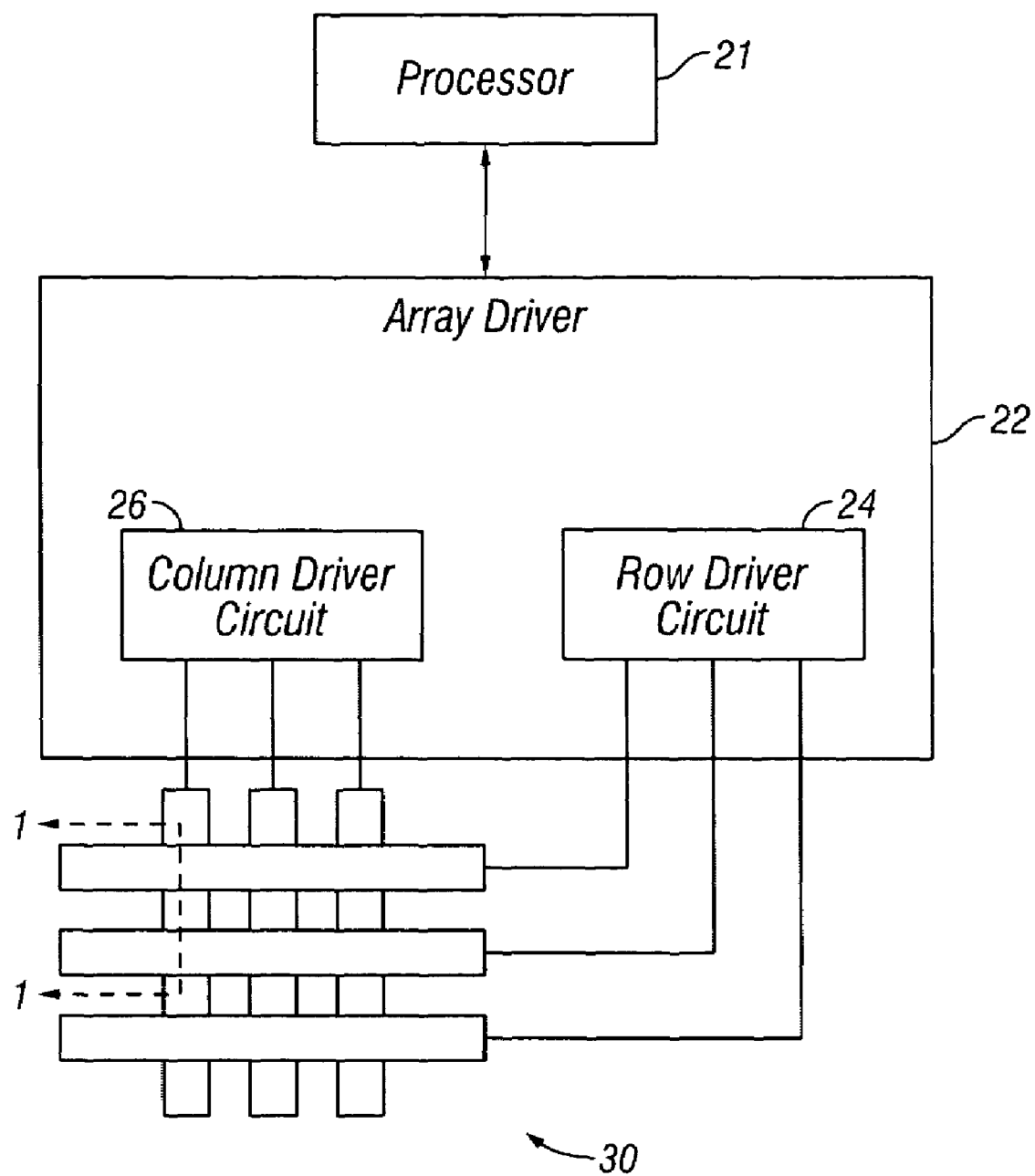
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
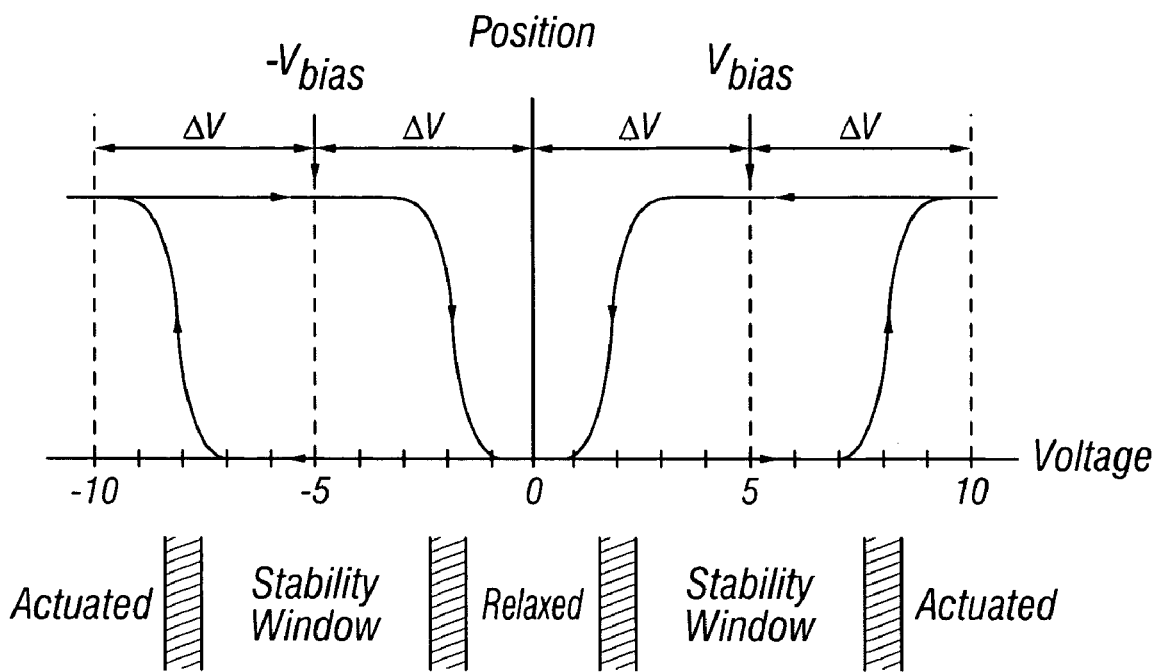
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
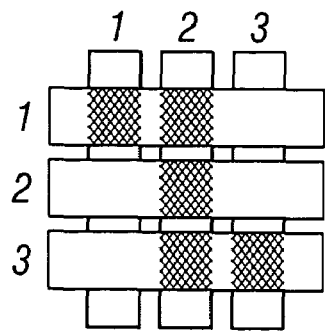
FIGS. 5A and 5B illustrate one exemplary timing diagram for row and column signals that may be used to write a frame of display data to the 3×3 interferometric modulator display of FIG. 2.
Figure 5B:
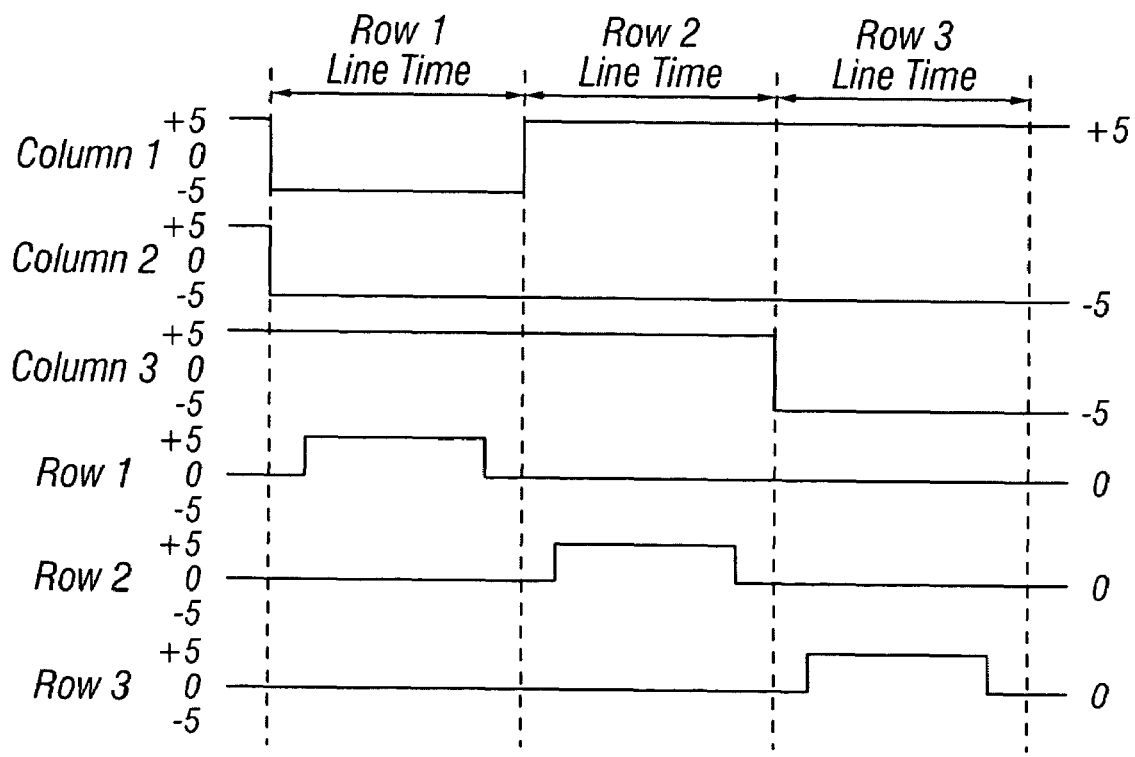

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
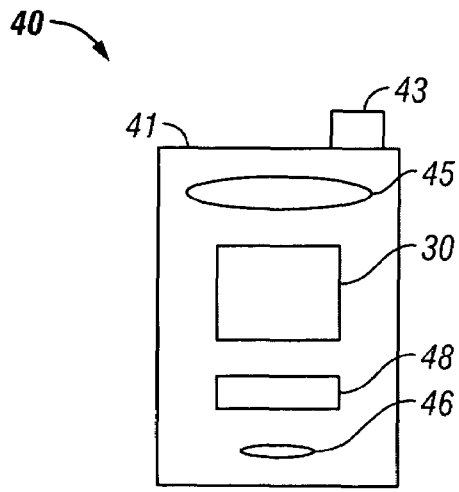
FIGS. 6A and 6B are system block diagrams illustrating an embodiment of a visual display device comprising a plurality of interferometric modulators.
Figure 6B:
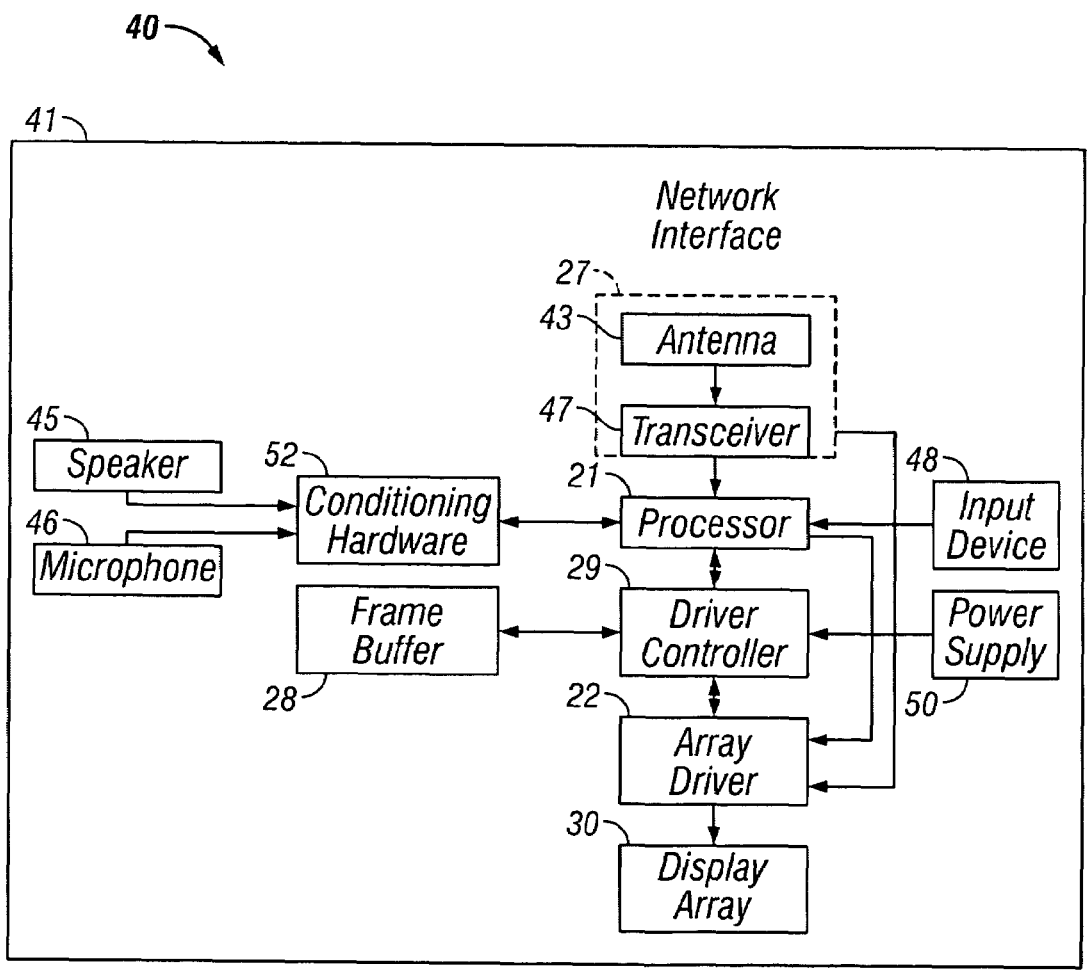

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
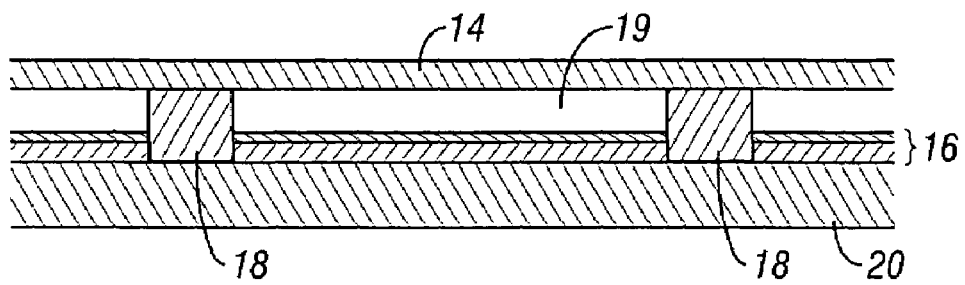
FIG. 7A is a cross section of the device of FIG. 1.
Figure 7B:
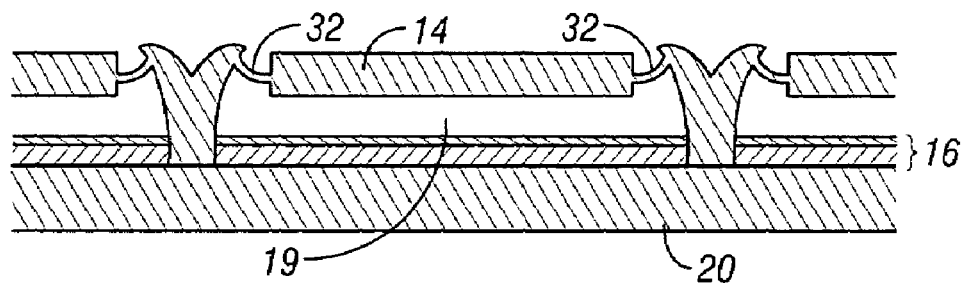
FIG. 7B is a cross section of an alternative embodiment of an interferometric modulator.
Figure 7C:
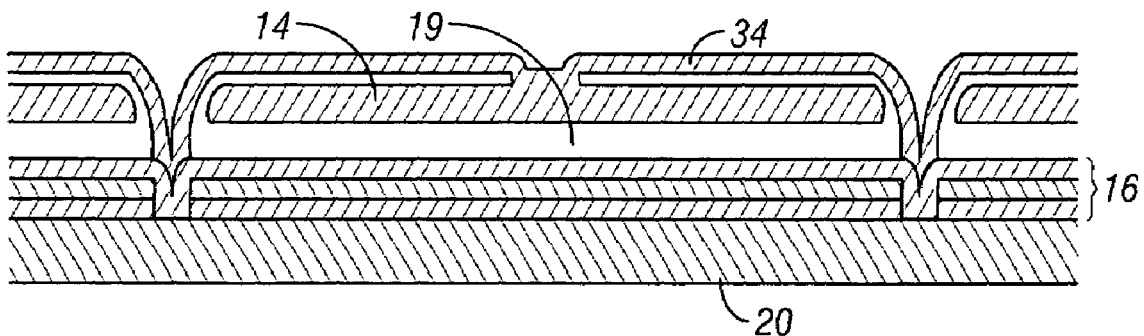
FIG. 7C is a cross section of another alternative embodiment of an interferometric modulator.
Figure 7D:
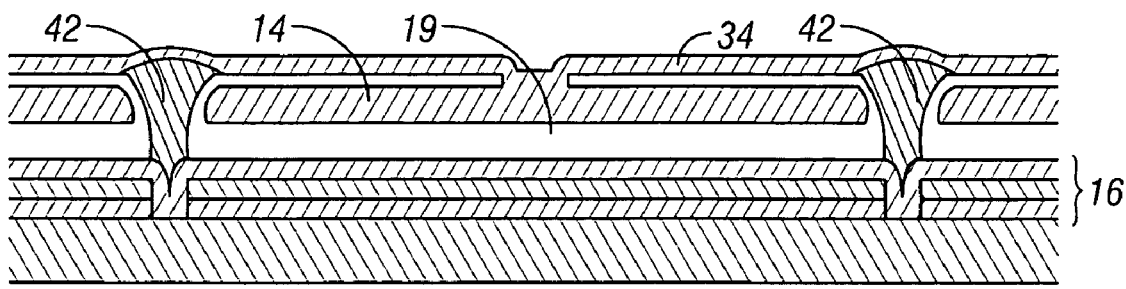
FIG. 7D is a cross section of yet another alternative embodiment of an interferometric modulator.
Figure 7E:
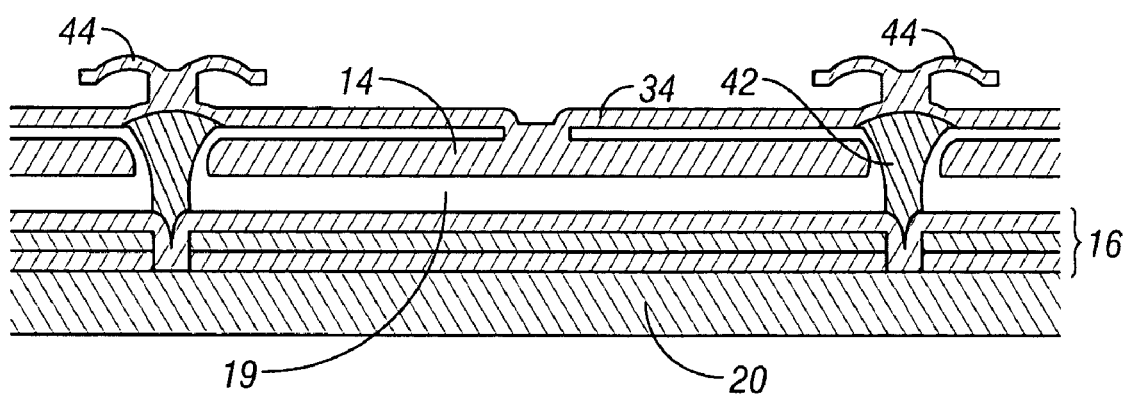
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

With some modifications the basic structure of an interferometric modulator can be used as a MEMS switch. When such switches are fabricated on the same substrate as a MEMS display array such as described above, they can be used to selectively couple individual row or column driver output lines to multiple rows or columns of the array respectively, thereby reducing the number of driver outputs needed for an array with a given number of rows and columns. This is particularly useful for color arrays which typically have separate sets of interdigitated columns for each primary color, and arrays where gray scale is rendered by spatial dithering which may have separate rows or columns corresponding to different gray levels. The switches thus allow greater gray scale depth and color palette and/or reduce the cost and complexity of the driver circuit. In these embodiments, it is especially advantageous if the switches can be manufactured with exactly, or nearly exactly, the same process steps as are used to produce the MEMS display elements. If the steps overlap completely, the switches can be produced at essentially no cost.

Figure 8A:
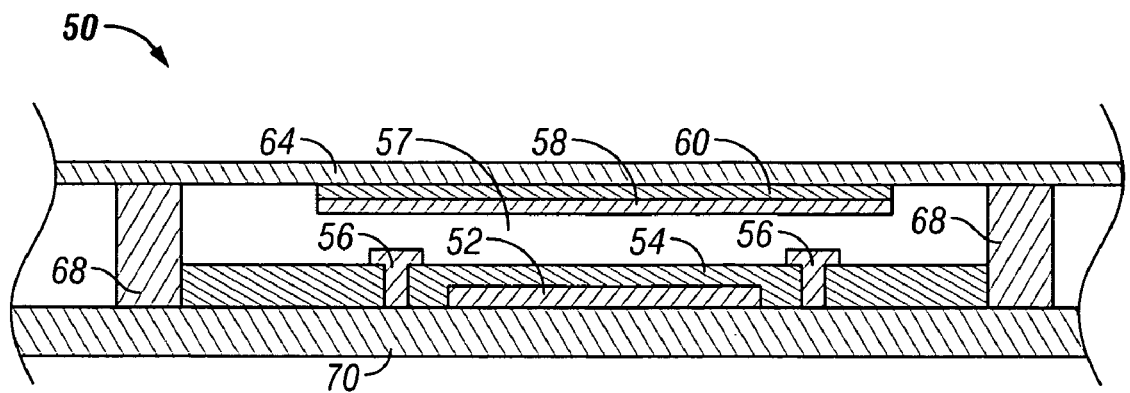
FIGS. 8A and 8B show an embodiment of a flexing membrane type MEMS switch

FIG. 8A is a cross-sectional side view of such a MEMS switch 50. The MEMS switch 50 of FIG. 8A has similar collapsible cavity features as the interferometric modulator of FIG. 7A. The MEMS switch 50 additionally includes two terminals 56, an insulating layer 60, and a conductive strip 58. As used herein, the term "terminal" of a switch is used to indicate a conductive element that provides a signal input or output to or from the switch. The switch itself provides selective electrical connections between its terminals. As will be seen from the description of the switch embodiments below, a switch may include a conductive element that is not itself a signal input or output point, but that selectively bridges different terminals to provide the switch function. These conductive elements are referred to as contact conductors herein.

Thus, the MEMS switch 50 is a structure that provides selective electrical contact between the two terminals 56. More particularly, the MEMS switch 50 is closed when the terminals 56 are in electrical contact and the MEMS switch is open when the terminals 56 are not in electrical contact. In a mechanically relaxed state, terminals 56 are not in electrical contact and, thus, the MEMS switch 50 is open. As shown in FIG. 8A, the MEMS switch 50 comprises a moveable material 64, a conductive strip 58, and an insulating layer 60 between the moveable material 64 and the conductive strip 58. A substrate 70 supports an electrode 52, and an insulating layer 54 on the electrode 52. Two terminals 56, separated by a distance, are deposited on and/or through the insulating layer 54. The terminals 56 may connect to other circuitry using vias through insulating layer 54 and/or electrode 52. Insulating layer 54 and moveable material 64 are mechanically separated by supports 68 in order to define a cavity 57. As described above with respect to interferometric modulators, the moveable material 64 is deformable, such that the moveable material 64 may be deformed towards the substrate 70 when a voltage difference is applied across the moveable material 64 and the electrode 52. This is analogous to the reflective material 14, substrate 20, and electrode 16 of FIG. 7A, and to the reflective layers 14a and 14b, the transparent substrate 20, and the reflective layers 16a and 16b of FIG. 1. The moveable material 64 may have on it an insulator 60, which has upon it the conductive strip 58. The conductive strip 58 is aligned so that when the moveable material 64 is deflected towards the substrate 70 by an applied potential as described above, the conductive strip 58 contacts both of the terminals 56, causing the terminals 56 to be in electrical contact and the MEMS switch 50 to be closed. The conductive strip thus acts as a contact conductor through which the terminals are electrically connected. In this embodiment, the conductive strip 58 is electrically isolated from the moveable material 64 by insulator 60 so that contact between the terminals 56 and the movable material 64 does not disturb the voltage difference applied across the moveable material 64 and the electrode 52. In these embodiments, the strip 58 is preferably small enough compared with the moveable material 64 that the electrostatic force between the strip 58 and the lower electrode 52 does not affect the operation of the device during actuation and release. In some embodiments, where such isolation is not necessary, the conductive strip 58 and the insulator 60 will not be needed, and the moveable material itself 64 can function as the contact conductor that bridges the two terminals 56. When the voltage applied across the moveable material 64 and the electrode 52 is reduced below a certain level (as is also described above), the moveable material 64 returns to its mechanically relaxed state and the MEMS switch 80 is opened.

Figure 8B:
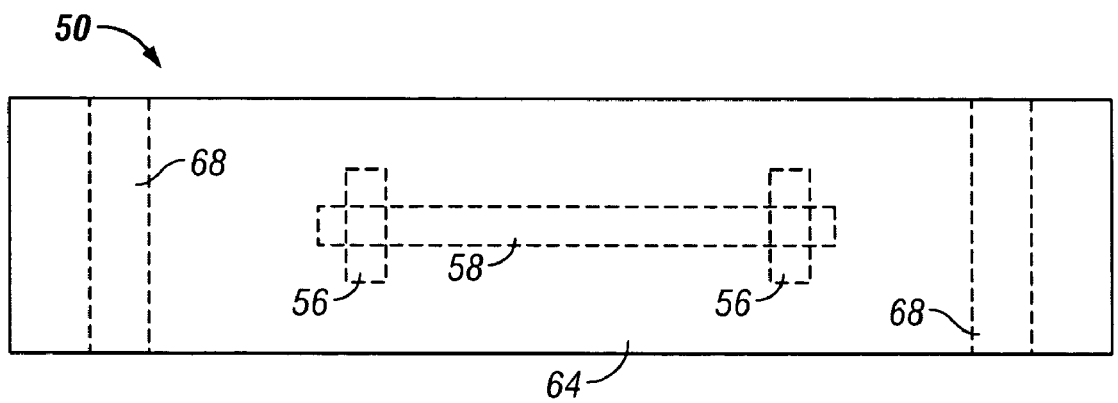

FIG. 8B is a top view of MEMS switch 50. The supports 68, the conductive strip 58, and the terminals 56 are shown as seen looking through the moveable material 64. Conductive strip 58 may be significantly smaller than the moveable material 64. This is to ensure that the electrostatic force between the moveable material 64 and the electrode 52 is larger than the electrostatic force between the conductive strip 58 and the electrode 52 because once the strip contacts the electrodes, the potential on the strip may differ from the potential on the moveable material.

It is possible to fabricate a double cavity switch embodiment wherein the moveable layer can deflect downward to a first pair of contacts and also upward to another pair of contacts. In these embodiments, a second insulator, similar to insulator 60, may be formed over the moveable material 64 and a second conductive strip, similar to conductive strip 58 formed over the second insulator. A second cavity, similar to cavity 57 would exist between the second conductive strip and a second insulating layer, similar to insulating layer 54. The second insulating layer would be supported by structures similar to supports 68 and would also have a second electrode, similar to electrode 52 and a second set of terminals similar to terminals 56. The structure over the moveable material 64 could have operation similar to that of the structure below the moveable layer discussed above. The moveable material 64 is configured to be moveable in the direction towards the second electrode when a sufficient potential difference is applied across the moveable material 64 and the second electrode. When this occurs the second conductive strip can make contact with the second set of terminals. With appropriate voltages on the moveable material 64, the electrode 52 and the second electrode this switch can be operated to electrically connect the terminals 56, the second set of terminals, or neither so as to form a tri-state switch. In some embodiments the structures over the moveable material may be similar in structure and in functionality. In other embodiments the structures over the moveable material may be similar only in functionality.

Figure 9:
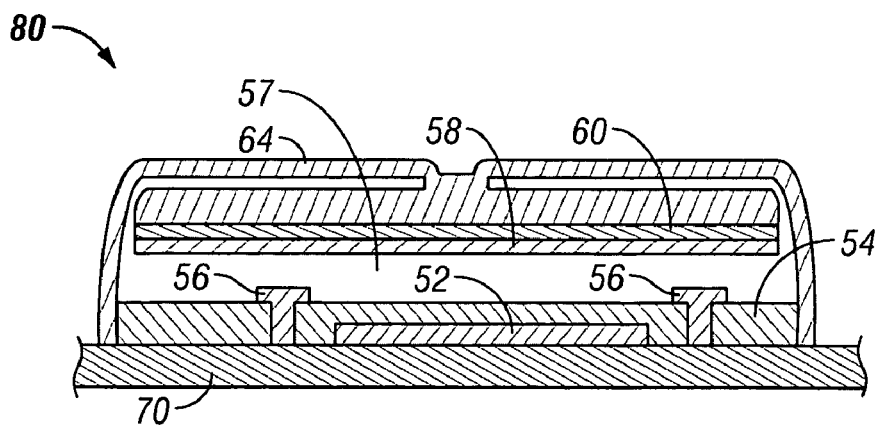
FIG. 9 shows another embodiment of a flexing membrane type MEMS switch.

FIG. 9 is a cross-sectional side view of a MEMS switch 80 of another embodiment. MEMS switch 80 has similar constructional features as the interferometric modulator of FIG. 7C. It also has MEMS switch functionality and features similar to those of MEMS switch 50 in FIG. 8A. Such features are labeled with like reference numerals as those used with reference to FIG. 8A.

FIG. 10 illustrates a modification of the MEMS switch of FIG. 9. In this embodiment, the terminals 82 are partially suspended over the surface of the dielectric 54. This design has several advantages. First, because the terminals 82 are raised above the dielectric material, the bottom surface of the contact conductor 58 is better prevented from touching the dielectric when the switch is closed. This reduces the likelihood that the contact conductor 58 becomes stuck in the down position from adherence (or "stiction") between the dielectric and the contact conductor. Also, the terminals will act as microsprings and have some compliance in response to the contact force produced between the contact conductor 58 and the terminals 82 when the switch is closed. This allows some sliding action to occur at the interface (known as "contact swiping") which helps remove contaminants such as hydrocarbons that build up on hydrophobic surfaces, and reduce contact resistance. In addition, deformation of the microsprings when the switch is closed will store strain energy which is helpful in breaking the contact between the contact conductor 58 and the terminals 82 when the switch is opened by removing the actuating voltage from the device. This reduces instances of stiction between the contact conductor 58 and the terminals 82.

Figure 10A:
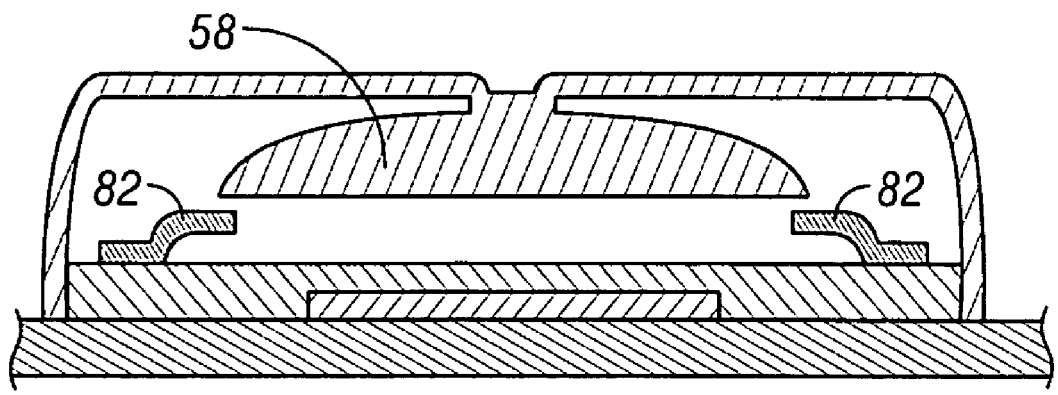
FIGS. 10A and 10B illustrate an embodiment of a MEMS switch with compliant switch terminals.
Figure 10B:
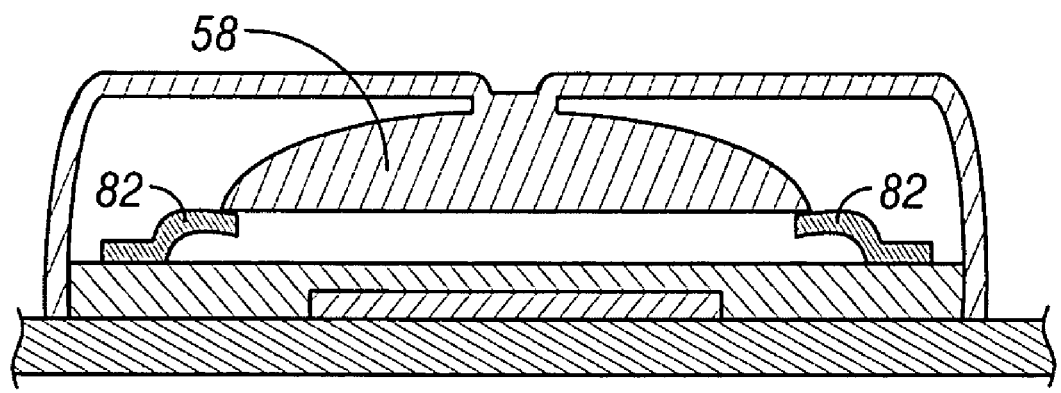
Figure 11:
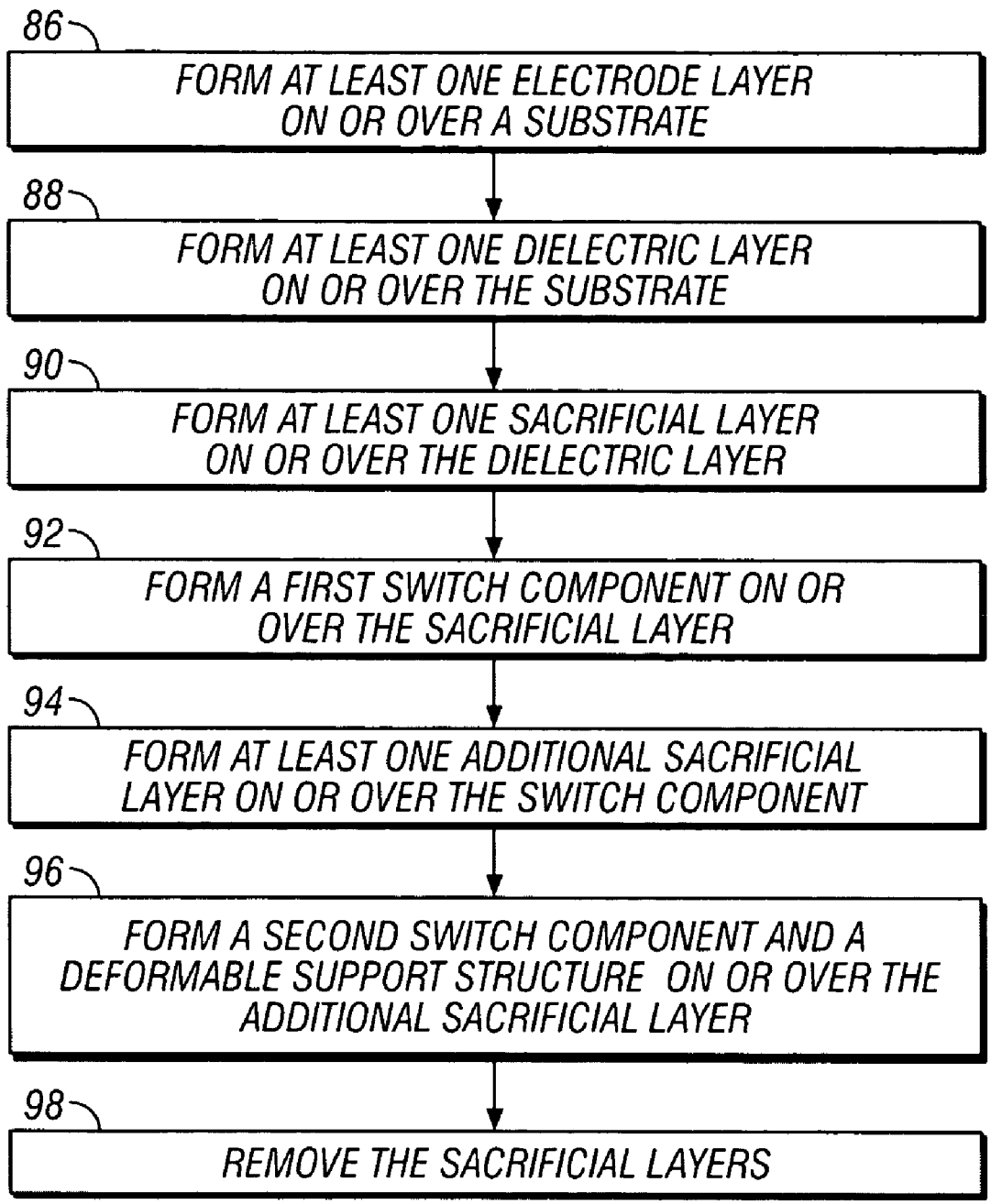
FIG. 11 is a flow chart of a method of manufacturing the MEMS switch of FIGS. 10A and 10B.

FIG. 11 is a flowchart of a series of fabrication steps that can be used to manufacture the MEMS switch of FIG. 10. FIGS. 12A-12E illustrate an embodiment of this switch at different stages of production.

Referring now to these Figures, at block 86 an electrode layer 102 is formed on or over a substrate 100, and will typically be patterned and etched into strips or other forms suitable for the MEMS display and switch configuration. At block 88, a dielectric layer 104 is formed on or over the electrode material. The dielectric may or may not be patterned and etched depending on the presence of vias or other circuit structures, or if only an air gap is desired between the electrode on the substrate and the moving electrode/mirror portion. At block 90, a sacrificial layer 114 is formed on or over the dielectric layer 104. The sacrificial layer 114 will also typically be patterned and etched into strips and/or blocks corresponding to MEMS device layout for the display and the switches. When used with a MEMS display, the substrate, electrode, dielectric, and sacrificial layer may be as described above with reference to interferometric modulators.

At block 92, a first switch component, in this case one or more of the terminals 112, is formed on or over the sacrificial layer 114. The terminals will advantageously be deposited, patterned, and etched such that a first portion 118 of the terminal material is deposited onto the dielectric, and a second portion 116 of the terminal material is deposited on the patterned sacrificial material. Lead connections and other signal paths can also be partly or wholly created in this step. A variety of materials can be used for all or part of the switch components, for example, Au, Ag, Cu, or Al may be suitable materials for this switch component formation step depending on the switch environment or function. It will be appreciated that one of the terminals could be already deposited on the dielectric if desired.

Figure 12A:
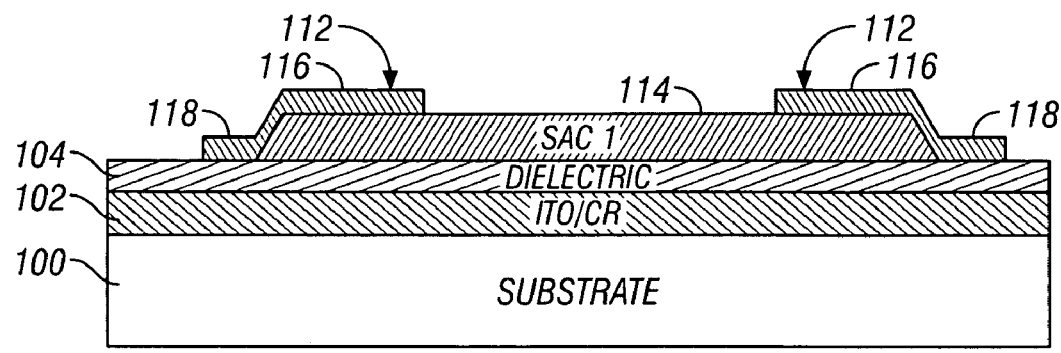
FIGS. 12A through 12E illustrate the MEMS switch of FIGS. 10A and 10B in different stages of fabrication.
Figure 12B:
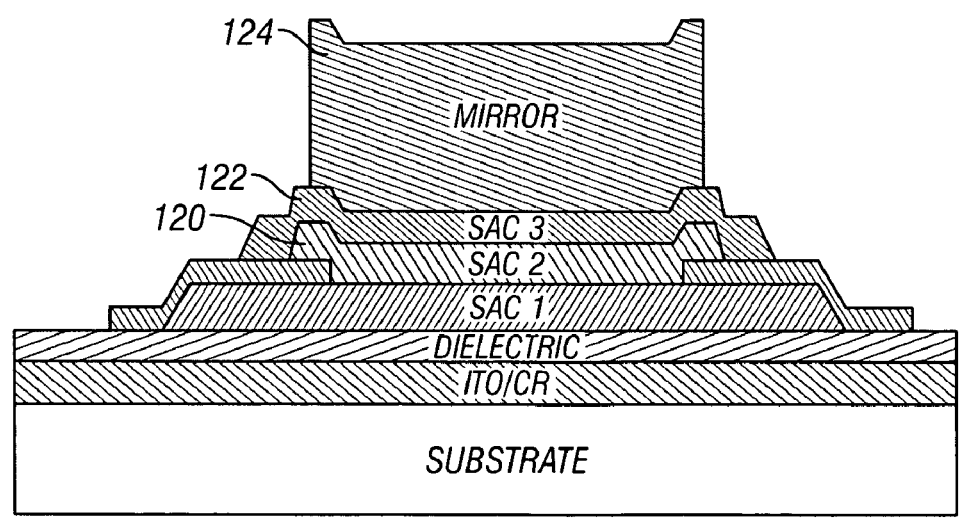

At block 94, at least one additional sacrificial layer is formed on or over the terminals 112. FIG. 12B illustrates two such additional sacrificial layers, 120 and 122. In some advantageous embodiments, the three sacrificial layers 114, 120, and 122 are used to create interferometric modulators with three different gap distances so that red, green, and blue colors are produced with the three different gaps. Switch manufacture alone would only require one additional sacrificial layer over the terminals. At block 96, a second switch component and a deformable support structure are formed on or over the sacrificial layers 120, 122.

In the embodiment of FIG. 12, the second switch component is the contact conductor 124 which may also be formed with the same or a different material as the first switch component. When switches and display elements are being manufactured at the same time and with the same material, this material may function as the mirror in the display elements. The contact conductor is thus patterned and etched corresponding to the positions of the switches and display elements. In some embodiments, a layer of gold or other material may be deposited, patterned, and etched between the upper sacrificial layer 122 and the bottom of the contact conductor 124 to plate the bottom of the contact conductor 124 with an electrically or otherwise advantageous material. An insulating layer as described above can be deposited between the plating and the contact conductor if desired for the application.

Figure 12C:
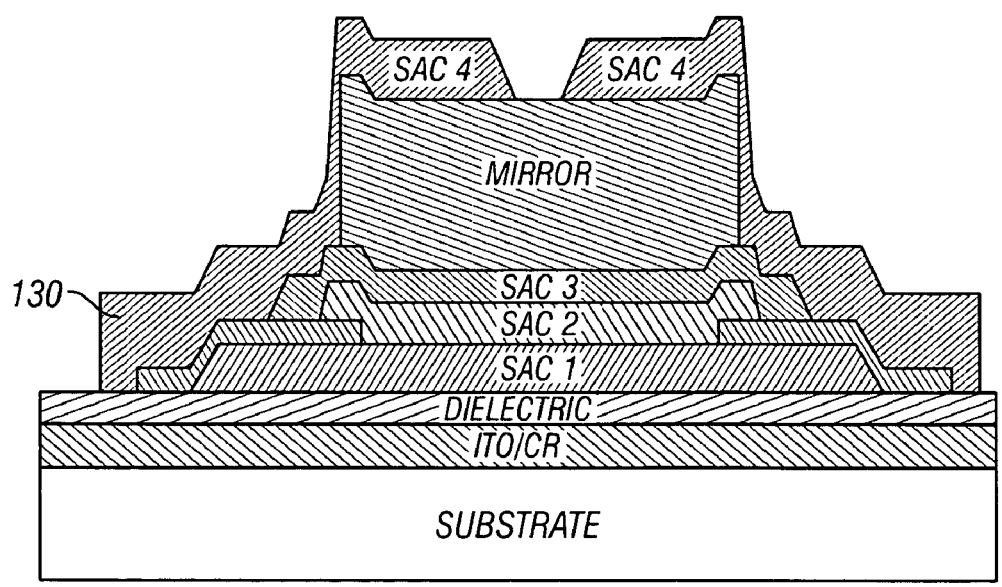
Figure 12D:
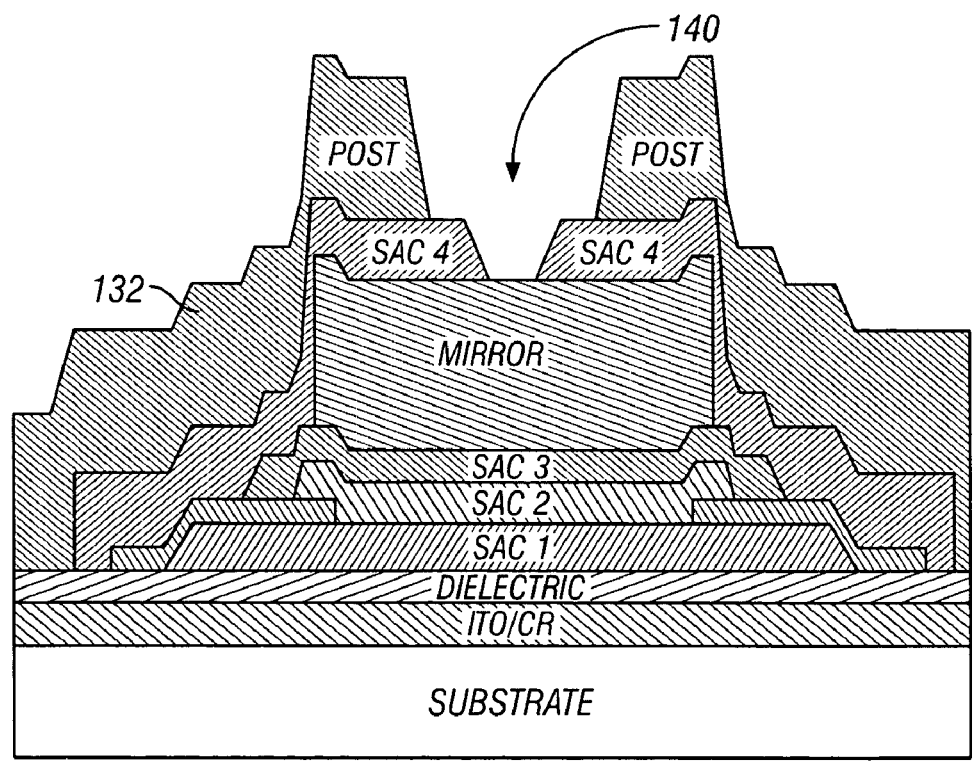
Figure 12E:
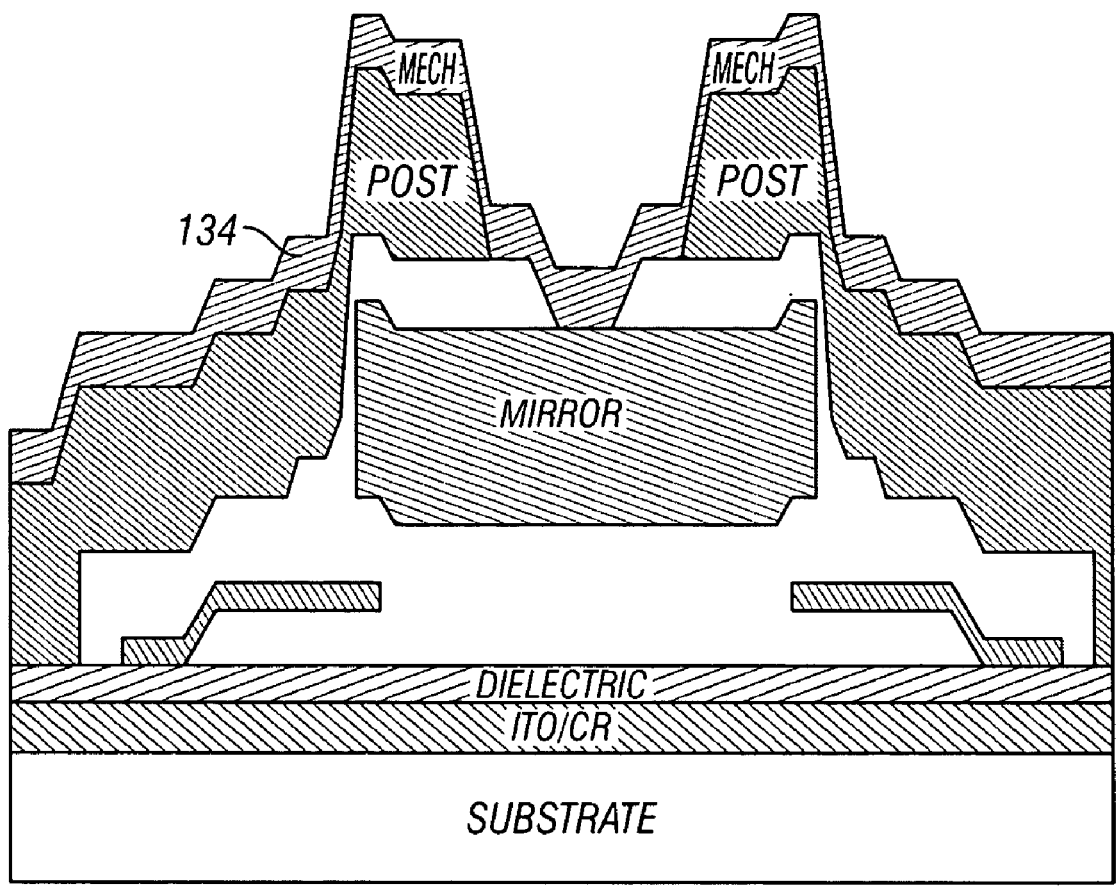

The construction of one support structure embodiment is illustrated in FIGS. 12C, 12D, and 12E. As shown in FIG. 12C, another sacrificial layer 130 is formed over the contact conductor and the rest of the material stack. This layer is then covered with a dielectric post material 132 such as silicon dioxide, which forms the support walls for the deformable structure. On or over the post material 132 is a mechanical layer 134 shown in FIG. 12E. The mechanical layer 134 may be made of nickel or aluminum for example, and bond to the contact conductor 124 through openings 140 previously patterned and etched in the fourth sacrificial layer 130 and the post layer 132.

Referring back to the flowchart of FIG. 11, at block 98, a xenon-flouride etch may be used to remove all four sacrificial layers, freeing the contact conductor for movement within the device when the support structure/mechanical layer are deformed.

Figure 13A:
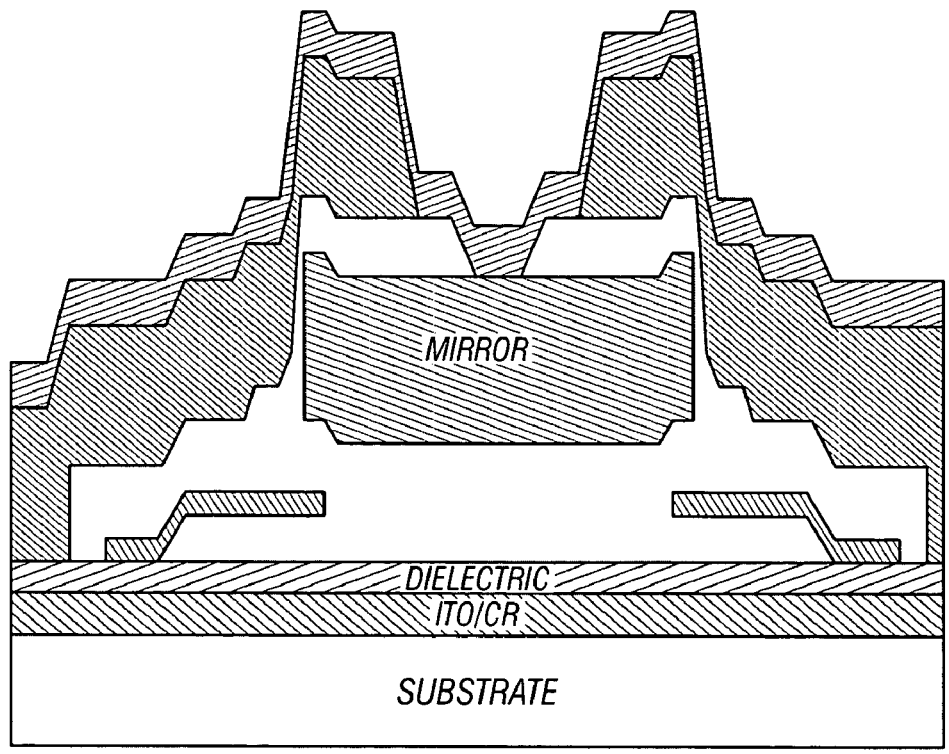
FIGS. 13A and 13B illustrate the switch of FIGS. 12A through 12E when completed.
Figure 13B:
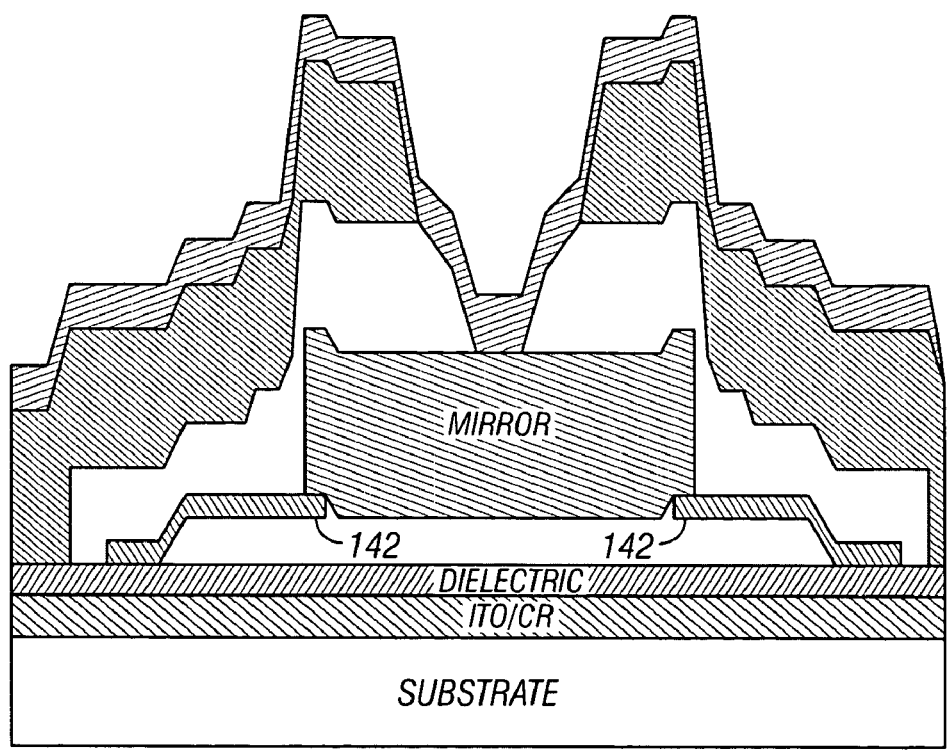

FIGS. 13A and 13B illustrate switch function, similar to FIGS. 10A and 10B. When the switch is actuated by a potential difference between the electrode 102 and the contact conductor 124, electrostatic forces pull the contact conductor 124 down, deform the mechanical layer, and connect the terminals through the contact conductor.

In some embodiments, the distance between the tips of the terminals is about 50 microns, and the overlap 142 between the terminals and the contact conductor is anywhere from 2 microns to 20 microns. The overlap distance can be selected considering the effects on contact resistance and stiction probability. In general, a smaller overlap reduces stiction, but may increase contact resistance.

The switch of FIGS. 10, 12 and 13 can be manufactured with the same process used to make interferometric modulators with only the additional step of depositing, patterning, and etching the terminals.

Figure 14A:
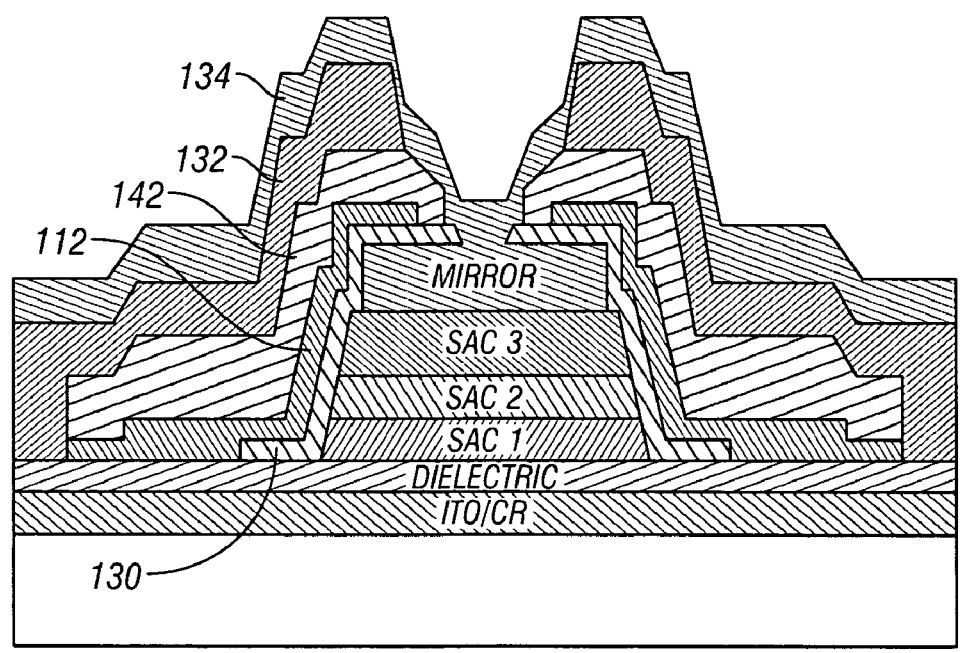
FIGS. 14A and 14B illustrate a normally closed switch embodiment.
Figure 14B:
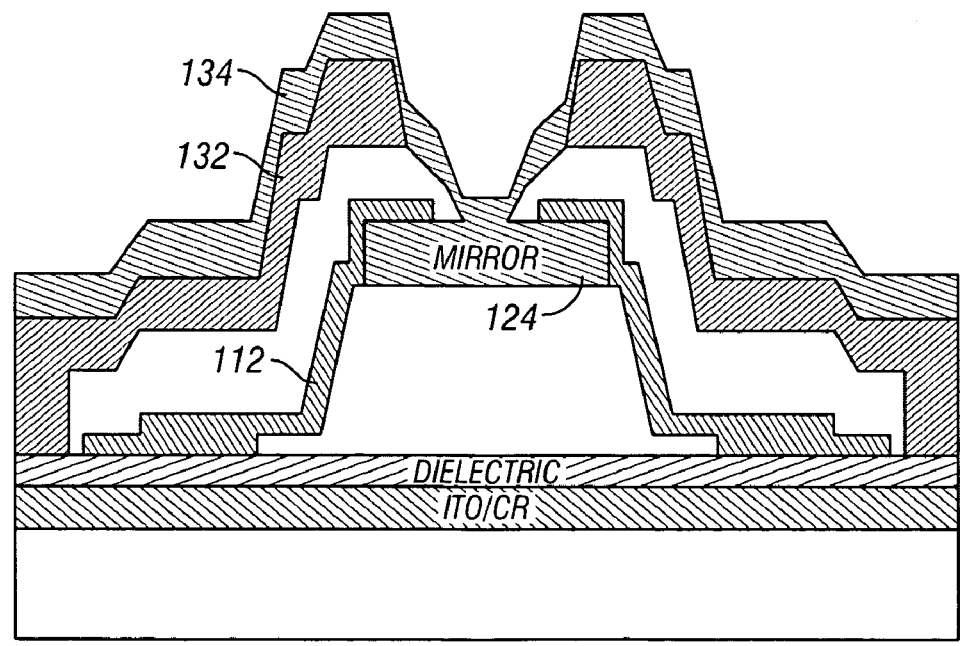

The switch of FIGS. 10, 12, and 13 is a normally open switch. When the mirror 124 and electrode 102 are near the same potential and the structure is mechanically relaxed, the terminals 112 are disconnected. The same steps of FIG. 11 can also be used to make a normally closed switch. This is illustrated in FIGS. 14A and 14B. FIG. 14A shows the switch during construction right before the final etch of the sacrificial layers. In this embodiment, the terminals 112 are deposited and etched after depositing and etching the fourth sacrificial layer 130, rather than after depositing and etching the first sacrificial layer 114 (FIG. 12A). The terminals are deposited and etched to extend up and over the top of the deposited mirror structure with the fourth sacrificial layer between. A fifth sacrificial layer 142 is deposited over the terminals and etched prior to the deposit and etch of the post material 132 and the mechanical layer 134.

FIG. 14B illustrates this switch embodiment after final sacrificial layer etch. The mechanical layer 134 can be deposited under tension so that when the sacrificial layers are removed, the mirror structure 124 launches upward to rest against the bottom surfaces of the terminals. The terminals can also be deposited to launch slightly downward upon removal of the sacrificial layers, thereby ensuring a good electrical contact between the top of the mirror 124 and the bottom of the terminals 112. This normally closed embodiment also exhibits the beneficial contact swiping described above.

Figure 15A:
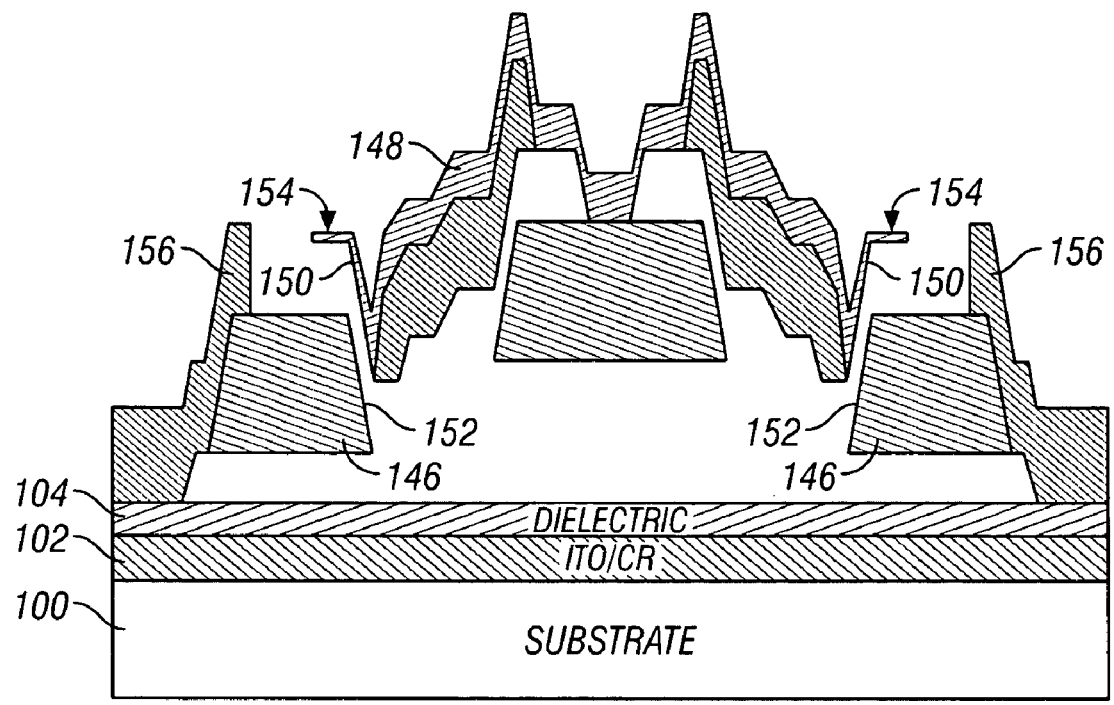
FIGS. 15A and 15B illustrate another embodiment of a MEMS switch.
Figure 15B:
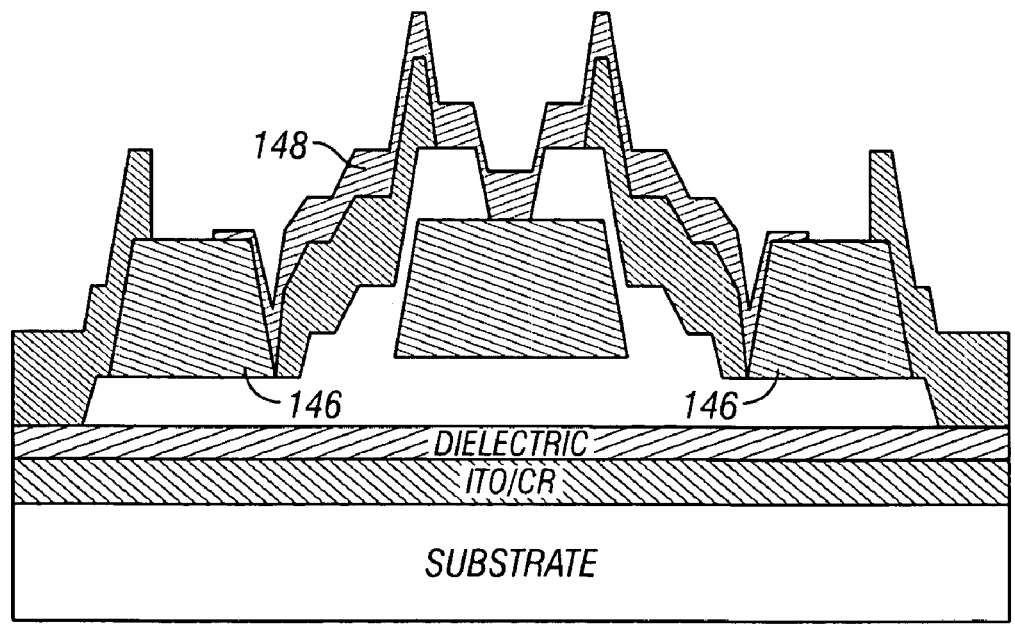

Another switch embodiment which may have many of the same advantages as the embodiment of FIGS. 10-13 is illustrated in FIG. 15A and 15B. In this embodiment, however, no additional terminal deposition step is required. In the embodiment of FIG. 15, the terminals 146 are formed by patterning and etching the layer that forms the contact conductor of the first embodiment of FIGS. 10 and 12. The contact conductor for the switch of FIG. 15 is formed by the metal mechanical layer 148.

FIG. 15A illustrates this embodiment in the open configuration, and 15B illustrates this embodiment in the closed configuration. When closed, angled surfaces 150 of the contact conductor 148 make contact with mating angled surfaces 152 of the terminals 146. These angled mating surfaces and the suspended arms 154 of the contact conductor produce the contact swiping that is also present in the first embodiment. This contact swiping is enhanced somewhat if the suspended arms 154 are compliant as described above with respect to the terminals 82. However, relatively rigid arms 154 may be utilized as well. The mechanical layer/contact conductor 148 may be supported by the post material 156 at the corners of the switch (at locations in a plane normal to the plane of FIG. 15) to suspend the structure above the dielectric 104.

Figure 16:
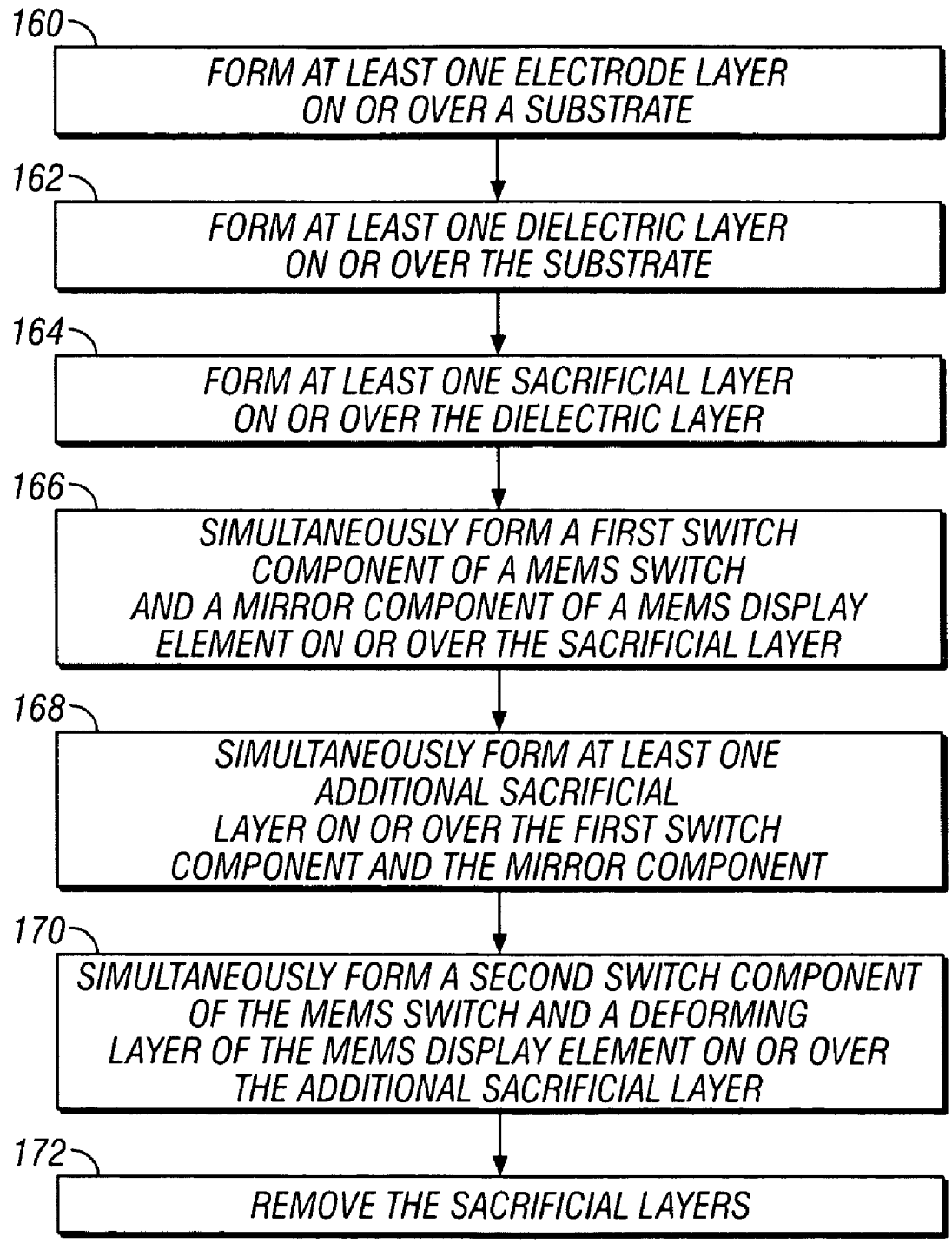
FIG. 16 is a flowchart of a method of manufacturing the MEMS switch of FIGS. 15A and 15B.
Figure 17A:
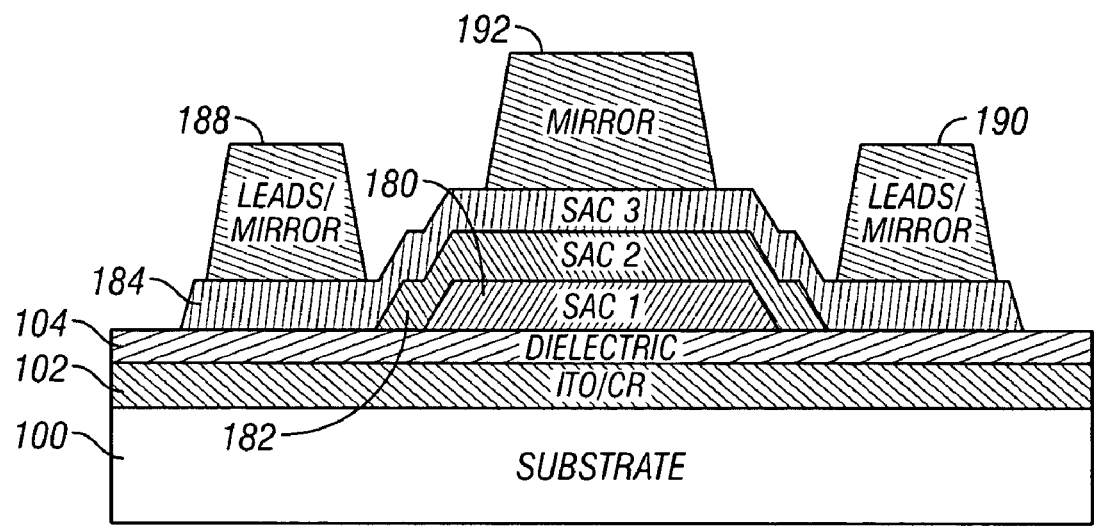
FIGS. 17A through 17C illustrate the switch of FIGS. 15A and 15B in different stages of fabrication.
Figure 17B:
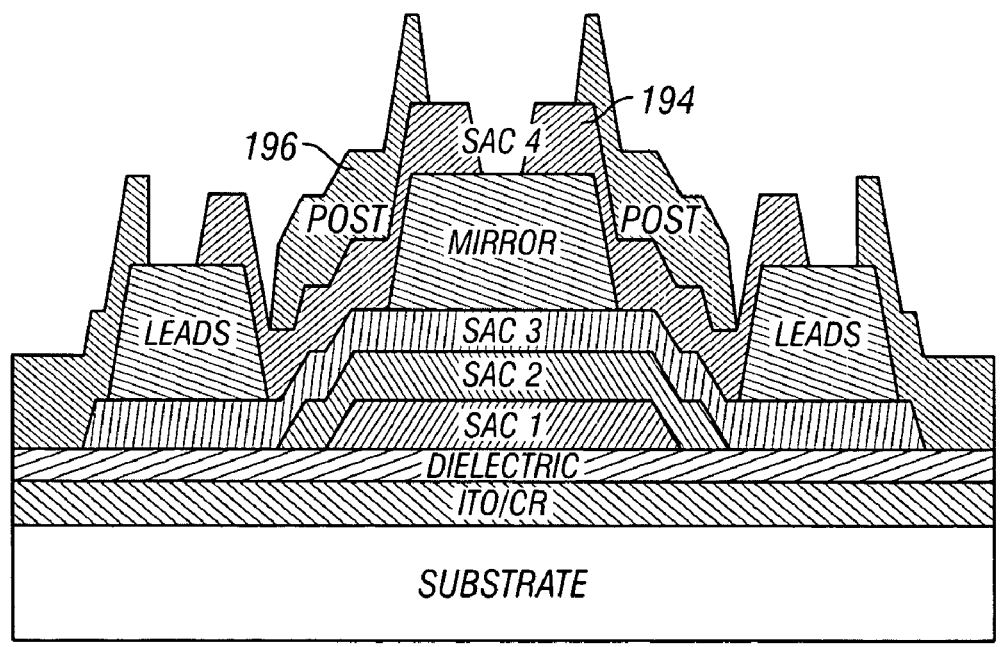
Figure 17C:
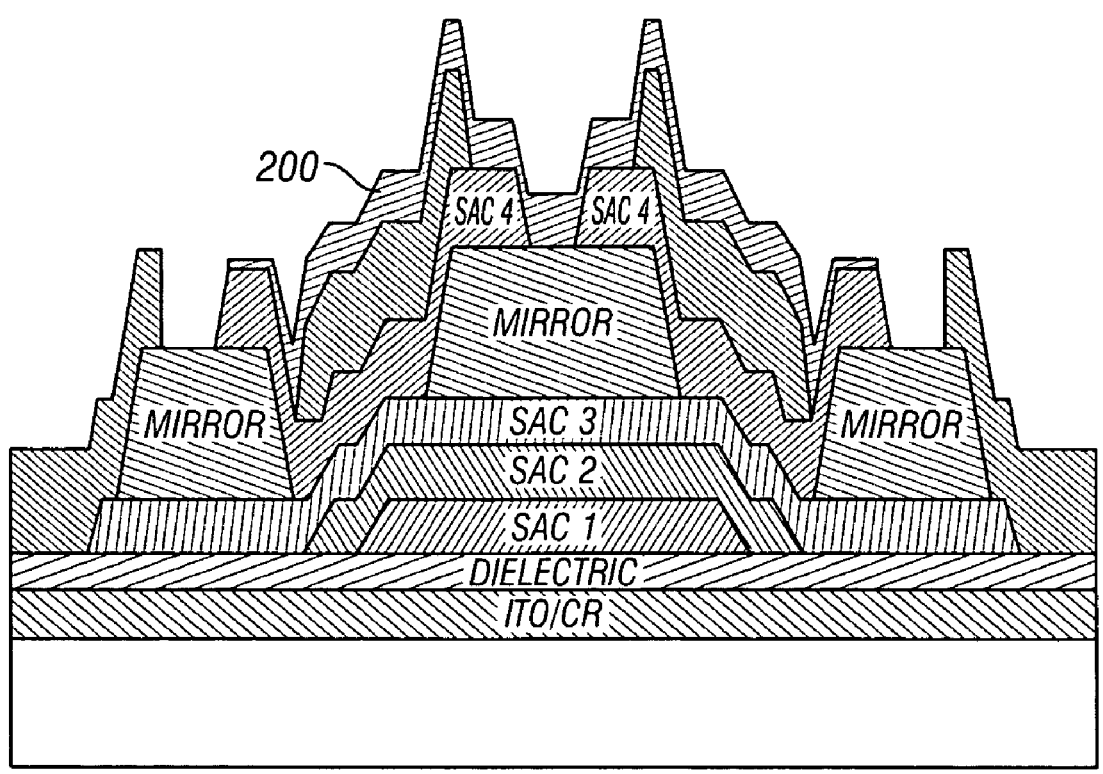

The MEMS switch of FIG. 15 can be manufactured with the same set of process steps as are set forth above in FIG. 11. However, as mentioned above, the switch of FIG. 15 can be manufactured without any deposition steps beyond those required for producing MEMS interferometric modulators for a display array. Thus, the switch embodiments of FIG. 14 are especially advantageous when manufactured simultaneously with a MEMS interferometric modulator array. FIG. 16 is a flowchart of a series of fabrication steps that can be used to manufacture MEMS switches of FIG. 15 simultaneously with MEMS interferometric modulators. FIGS. 17A-17C illustrate an embodiment of the switch at different stages of production during this process.

The first three blocks of FIG. 16 are the same as set forth above with respect to FIG. 11. Referring now to FIGS. 16 and 17A-17C, at block 160 an electrode layer is formed on or over a substrate, and at block 162, a dielectric layer is formed on or over the electrode layer. At block 164, at least one sacrificial layer is formed on or over the dielectric layer. In the embodiment of FIG. 17, the one or more sacrificial layers are the three sacrificial layers 180, 182, and 184 used to create the three different color interferometric modulators of the display array.

At block 166, a first switch component of the MEMS switches and a mirror component of the MEMS interferometric modulators are simultaneously formed over the sacrificial layer or layers. As shown in FIG. 17A, for the switches, the first and second sacrificial layers are etched relatively narrowly relative to the third sacrificial layer. When the mirror material is deposited, edge portions 188, 190 form closer to the dielectric 104 than the central portion 192. It will be appreciated that the edge portions 188, 190 need not be deposited on top of the layer 184, but the layer 184 could be eliminated or etched smaller such that the edge portions 188, 190 are deposited directly onto the dielectric 104. The material between these portions is etched, leaving three separated metal (e.g. aluminum) terminals 188 and 190 and a central metal section 192 separated from the terminals. If desired, the switch components 188, 190, 192 could be formed of multiple layers of varying materials, such as an aluminum lower layer and a Au or Ag upper layer for better switch characteristics in the contact regions. During this step in the process of forming the interferometric modulators, the mirror layer is formed as a single solid and relatively flat piece, rather than three separate pieces at different heights above the substrate as shown for the switch of FIG. 17.

At block 168 an additional sacrificial layer 194 is deposited on or over the first switch component, the terminals 188, 190 in this embodiment. This layer 194 is then masked and etched.

As shown in FIG. 17B, post material 196 for a support structure is then deposited, masked and etched over the sacrificial layer 194.

At block 170, a second switch component of the MEMS switch and a deforming mechanical layer of the interferometric modulators are formed on or over the sacrificial layer. This is shown in FIG. 17C as metal layer 200, which could be nickel or aluminum as described above.

At block 172, the sacrificial layers are removed, and the switch as in FIG. 15 is produced. The interferometric modulators of the array are also produced with the same steps.

Figure 18A:
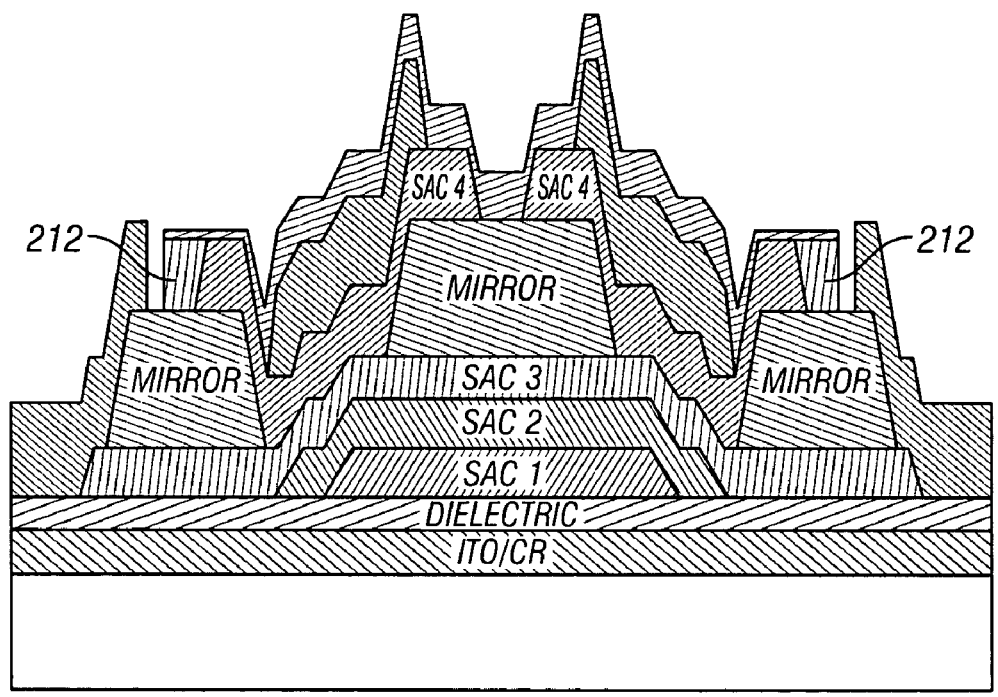
FIGS. 18A-18C illustrate a modified version of the switch of FIGS. 15A and 15B.
Figure 18B:
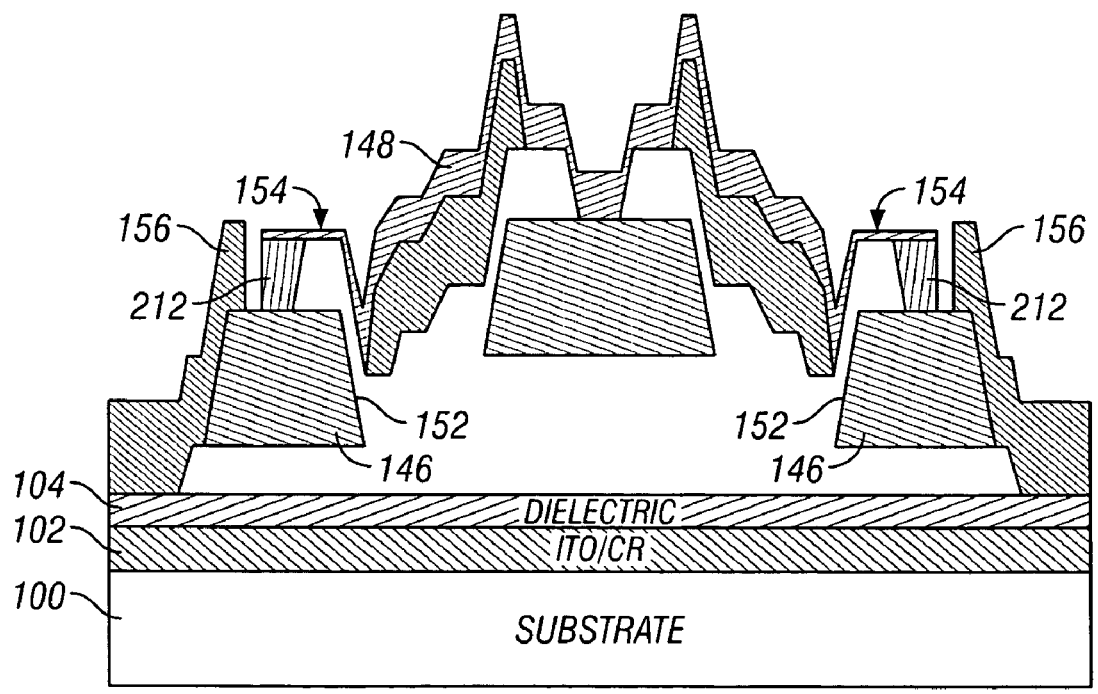
Figure 18C:
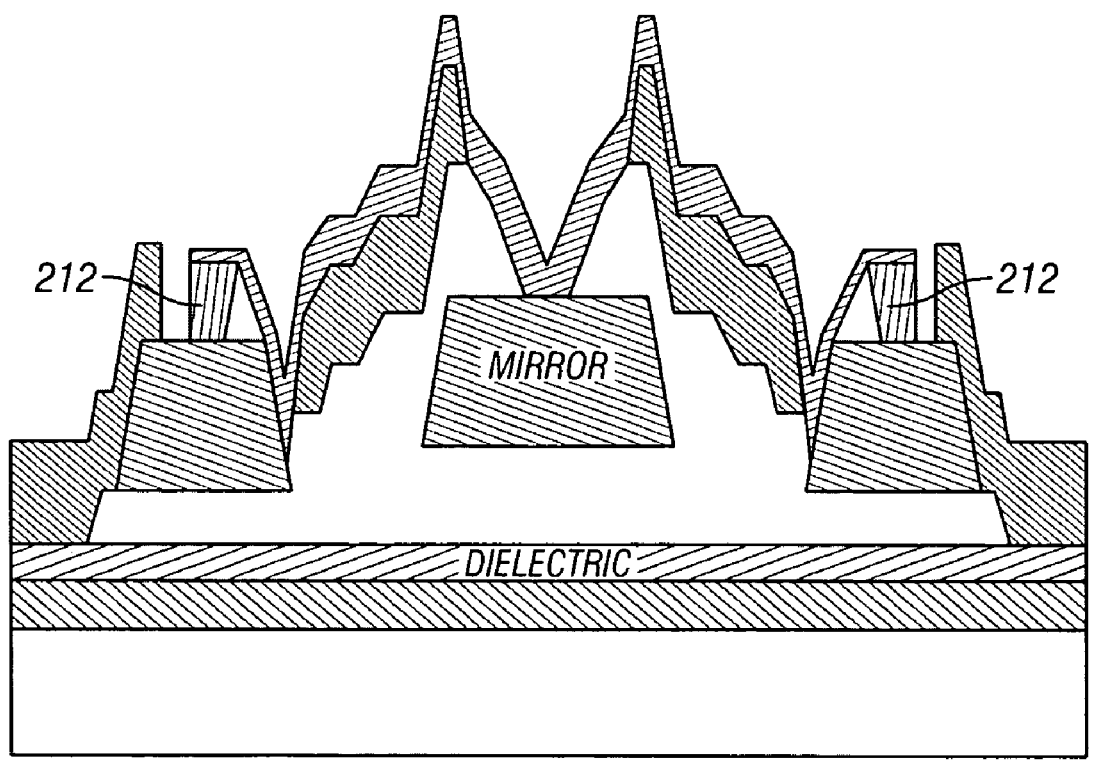

A modified version of the switch of FIG. 17 is illustrated in FIGS. 18A-18C. In this embodiment, the contact conductor formed by the mechanical layer 200 is attached to the top surfaces of the terminals 146 by additional dielectric posts 212. These posts 212 can be deposited and etched after the fourth sacrificial layer and either before or in conjunction with the deposition and etch of the other post material 156. Operation of this switch is shown in FIGS. 18B and 18C. In the unactuated state of 18B, the terminals are disconnected. When actuated as shown in FIG. 18C, the mechanical layer 148 and posts 212 will bend and stretch until the angled portions of the contact conductor come into contact with the angled portions of the terminals as described above with reference to FIGS. 15A and 15B. This switch may be more reliable than the switch of FIGS. 15A and 15B, however, since the additional posts 212 will provide additional mechanical bias to the relaxed configuration, reducing stiction.

In some embodiments, combinations of MEMS switches can be used to create digital logic functions, such as AND, NAND, NOR, OR, XOR, XNOR, and AOI. Other digital logic functions and combinations are also possible.

Logic blocks comprising assert open or combinations of assert open and assert closed MEMS switches may be arranged together to provide logical functions typically found in external components, thereby saving system cost. For example, MEMS switches may be arranged for use in the capacity of low leakage transistors, shift registers, or decoders. In the context of an interferometric modulator display, MEMS switches may be used in conjunction with row drivers or column drivers, for example. Advantageously, MEMS switches may be manufactured on various substrates, such as glass substrates, silicon or plastic substrates, for example. Placing switches on large area glass substrates is generally less expensive than silicon substrates, providing an advantage over many forms of conventional transistor based logic.

While the above detailed description has shown, described, and pointed out novel features as applied to various embodiments, it will be understood that various omissions, substitutions, and changes in the form and details of the device or process illustrated may be made by those skilled in the art without departing from the spirit of the invention.

As will be recognized, the present invention may be embodied within a form that does not provide all of the features and benefits set forth herein, as some features may be used or practiced separately from others, and features of one embodiment may be combined with features of other embodiments.

The invention claimed is:

1. A microelectromechanical systems (MEMS) switch comprising:
   at least first and second terminals;
   a contact conductor that electrically connects at least a pair of said terminals when said switch is closed;
   a first electrode; and
   a moveable element having at least a portion thereof forming a second electrode;
   wherein said moveable element is moveable in response to applied electric potentials between the second electrode and the first electrode, wherein the first and second terminals are selectively connectable depending on the position of said moveable element, wherein said contact conductor, at least one of said terminals, or both, are configured to be compliant in response to a contact force produced between said contact conductor and at least one of said terminals when said switch is closed, and wherein said contact conductor and said at least one terminal are configured to slidingly interface.

2. The MEMS switch of claim 1, wherein said terminals are relatively compliant and said moveable element is relatively rigid.

3. The MEMS switch of claim 1, wherein said terminals are relatively rigid and said moveable element is relatively compliant.

4. The MEMS switch of claim 1, wherein a dielectric material is between said first electrode and said second electrode.

5. The MEMS switch of claim 4, wherein said moveable element is prevented from contacting said dielectric material by said terminals.

6. The MEMS switch of claim 1, wherein said moveable element is supported over a substrate, and wherein a portion of at least one terminal is also supported over said substrate.

7. The MEMS switch of claim 6, wherein a first portion of said terminal is deposited on said substrate, and a second portion of said terminal is suspended over said substrate.

8. The MEMS switch of claim 1, wherein said switch is closed when said electric potential between said second electrode and said first electrode is above a threshold.

9. The MEMS switch of claim 1, wherein said switch is closed when said electric potential between said second electrode and said first electrode is below a threshold.

10. A MEMS switch comprising:
    a deforming membrane;
    a contact conductor coupled to said deforming membrane and configured to move in response to deformation of said membrane, said contact conductor having at least one surface that is angled with respect to said contact conductor movement;
    at least one terminal having a surface that is angled to mate with said angled surface of said contact conductor in response to deformation of said membrane.

11. The MEMS switch of claim 10, wherein said angled surface of said contact conductor is configured to be compliant in response to a contact force produced between said contact conductor and at least one terminal when said switch is closed.

12. The MEMS switch of claim 10, wherein at least a portion of said contact conductor is a rigid structure.

13. The MEMS switch of claim 10, wherein said contact conductor is coupled to said at least one terminal through a dielectric material.

14. A method of making a MEMS switch, said method comprising:
    forming at least one electrode layer on or over a substrate;
    forming at least one dielectric layer on or over said electrode layer;
    forming at least one sacrificial layer on or over said dielectric layer;
    forming at least one switch terminal on or over said at least one sacrificial layer;

forming at least one additional sacrificial layer on or over said at least one switch terminal;

forming a contact conductor on or over said at least one additional sacrificial layer; and removing said sacrificial layers.

15. The method of claim 14, comprising depositing conductive material on or over said dielectric layer prior to depositing said sacrificial layer on or over said dielectric layer.

16. The method of claim 14, wherein said forming at least one switch terminal comprises depositing conductive material onto both said sacrificial layer and onto exposed portions of said dielectric layer and/or said substrate.

17. The method of claim 14, comprising forming a second dielectric layer on or over at least a portion of said at least one additional sacrificial layer.

18. The method of claim 17, wherein forming said contact conductor comprises depositing conductive material onto both said second dielectric layer and onto exposed portions of said at least one additional sacrificial layer.

19. A MEMS switch made by the method of claim 14.

20. A MEMS switch comprising:
a substrate;
at least one switch terminal having at least a portion thereof cantilevered over said substrate;
a deformable portion suspended over said substrate, wherein at least a portion of said deformable portion comprises a contact conductor that contacts said at least one switch terminal when said deformable portion is deformed under the influence of a voltage.

21. The MEMS switch of claim 20, wherein said at least one switch terminal has a portion fixed to said substrate and a portion suspended over said substrate.

22. A method of simultaneously forming at least one MEMS display element and at least one MEMS switch, said method comprising:
forming at least one electrode layer on or over a substrate;
forming at least one dielectric layer on or over said substrate;
forming at least one sacrificial layer on or over said dielectric layer;
simultaneously forming a first switch component of a MEMS switch and a mirror component of a MEMS display element on or over said sacrificial layer;
simultaneously forming at least one additional sacrificial layer on or over said first switch component and said mirror component
simultaneously forming a second switch component of said MEMS switch and a deforming layer of said MEMS display element on or over the additional sacrificial layer; and
removing said sacrificial layers.

23. The method of claim 22, wherein said first switch component comprises a switch terminal.

24. The method of claim 22, wherein said second switch component comprises a contact conductor.

25. A display apparatus made by a method comprising:
forming at least one electrode layer on or over a substrate;
forming at least one dielectric layer on or over said substrate;
forming at least one sacrificial layer on or over said dielectric layer;
simultaneously forming a first switch component of a MEMS switch and a mirror component of a MEMS display element on or over said sacrificial layer;
simultaneously forming at least one additional sacrificial layer on or over said first switch component and said mirror component
simultaneously forming a second switch component of said MEMS switch and a deforming layer of said MEMS display element on or over the additional sacrificial layer; and
removing said sacrificial layers.

* * * * *